US012764365B2

(12) United States Patent
Rini et al.

(10) Patent No.: US 12,764,365 B2
(45) Date of Patent: Oct. 13, 2026

(54) ESTIMATING STREAMING MEDIA PROGRAM VIEWING PER STREAMING PLATFORM SOURCES

(71) Applicant: The Nielsen Company (US), LLC, New York, NY (US)

(72) Inventors: Kevin J. Rini, Tampa, FL (US); Brian Fuhrer, Crystal Beach, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 18/942,378

(22) Filed: Nov. 8, 2024

(65) Prior Publication Data

US 2025/0150658 A1 May 8, 2025

Related U.S. Application Data

(60) Provisional application No. 63/597,336, filed on Nov. 8, 2023.

(51) Int. Cl.
*H04N 21/25* (2011.01)
*H04N 21/24* (2011.01)
*H04N 21/442* (2011.01)

(52) U.S. Cl.
CPC ....... *H04N 21/252* (2013.01); *H04N 21/2407* (2013.01); *H04N 21/44204* (2013.01)

(58) Field of Classification Search
CPC .................... H04N 21/2407; H04N 21/44204
See application file for complete search history.

(56) References Cited

U.S. PATENT DOCUMENTS

| | | | |
|---|---|---|---|
| 10,805,690 B2 | 10/2020 | Kerkes | |
| 11,243,997 B2 | 2/2022 | Kerkes et al. | |
| 11,329,902 B2 | 5/2022 | Pilkington-Lewis et al. | |
| 11,553,054 B2 | 1/2023 | Deng et al. | |
| 11,582,057 B2 * | 2/2023 | Ansari | G05B 15/02 |
| 12,284,118 B2 * | 4/2025 | Kozak | H04L 47/20 |
| 2008/0056675 A1 * | 3/2008 | Wright | H04N 5/765 386/E5.002 |
| 2022/0150590 A1 * | 5/2022 | Dong | H04N 21/44204 |
| 2025/0047935 A1 * | 2/2025 | Achilles | H04N 21/26241 |

* cited by examiner

*Primary Examiner* — Nathan J Flynn
*Assistant Examiner* — Christine A Kurien

(57) ABSTRACT

Estimate streaming media program viewing per streaming platform source by identifying instances of streaming a particular media content from a set of media presentation environments; analyzing those instances of streaming the particular media content to determine one of multiple streaming platform sources associated with the particular media content based on an analysis of network traffic associated with the media presentation environments; and upon aggregating a threshold-satisfying set of such analyzed instances, determining a distribution of the particular media content viewing amongst the multiple streaming platform sources associated with the particular media content.

20 Claims, 6 Drawing Sheets

ESTIMATING STREAMING MEDIA PROGRAM VIEWING PER STREAMING PLATFORM SOURCES

CROSS-REFERENCE TO RELATED APPLICATIONS

This disclosure claims priority to U.S. Provisional Pat. App. No. 63/597,336, filed Nov. 8, 2023, which is hereby incorporated by reference herein in its entirety.

SUMMARY

Streaming media services provide access to their users to certain media content that is available through streaming applications (apps) that facilitate users playing out the media content on media presentation devices delivered via the internet.

Some metering devices employed by audience measurement systems include sensors (e.g., audio sensors) to obtain information useful to identify media content being presented in a household. Media content may be identified by decoding codes (e.g., audio watermarks) embedded in the media content and which encode content identifying information therein. Media content may additionally or alternatively be identified by generating a characteristic descriptor of the media content (e.g., audio signatures) that are then compared with a reference database of such signatures corresponding to identified content to identify a matching reference signature, thereby identifying the media content. Such content metering devices may be located in households of a statistically representative panel to monitor media presentations in those households. Metering information from such meters can then be obtained and used to estimate the extent of media presentations amongst an even greater number of households, such as within a given media market.

Some audience measurement systems may further include network metering devices (streaming meter devices) in certain households to monitor the local area network traffic of the household. Such a streaming meter device can access network traffic of the household, detect presentation of streaming media using the network traffic, and generate tuning data associated with the streaming meter. Such tuning data from the streaming meter may include the raw data that the streaming meter collects via network traffic, such as the uniform resource locator (URL) of the streaming service being used, a media device on which the streaming media is presented, a start timestamp of the usage, an end timestamp of the usage, and/or a bandwidth consumption of the usage. Such tuning data can then be provided to an audience measurement service provider and used as a basis to estimate an extent of viewership of certain streaming media programs. In some cases, the tuning data may be used to determine which streaming media platform the streaming media is accessed through (e.g., such as by associating a URL and/or network packet header information with a given streaming media platform).

This disclosure relates generally to using such information to estimate streaming media program viewing per streaming platform source.

DETAILED DESCRIPTION

I. Overview

Figure 1:
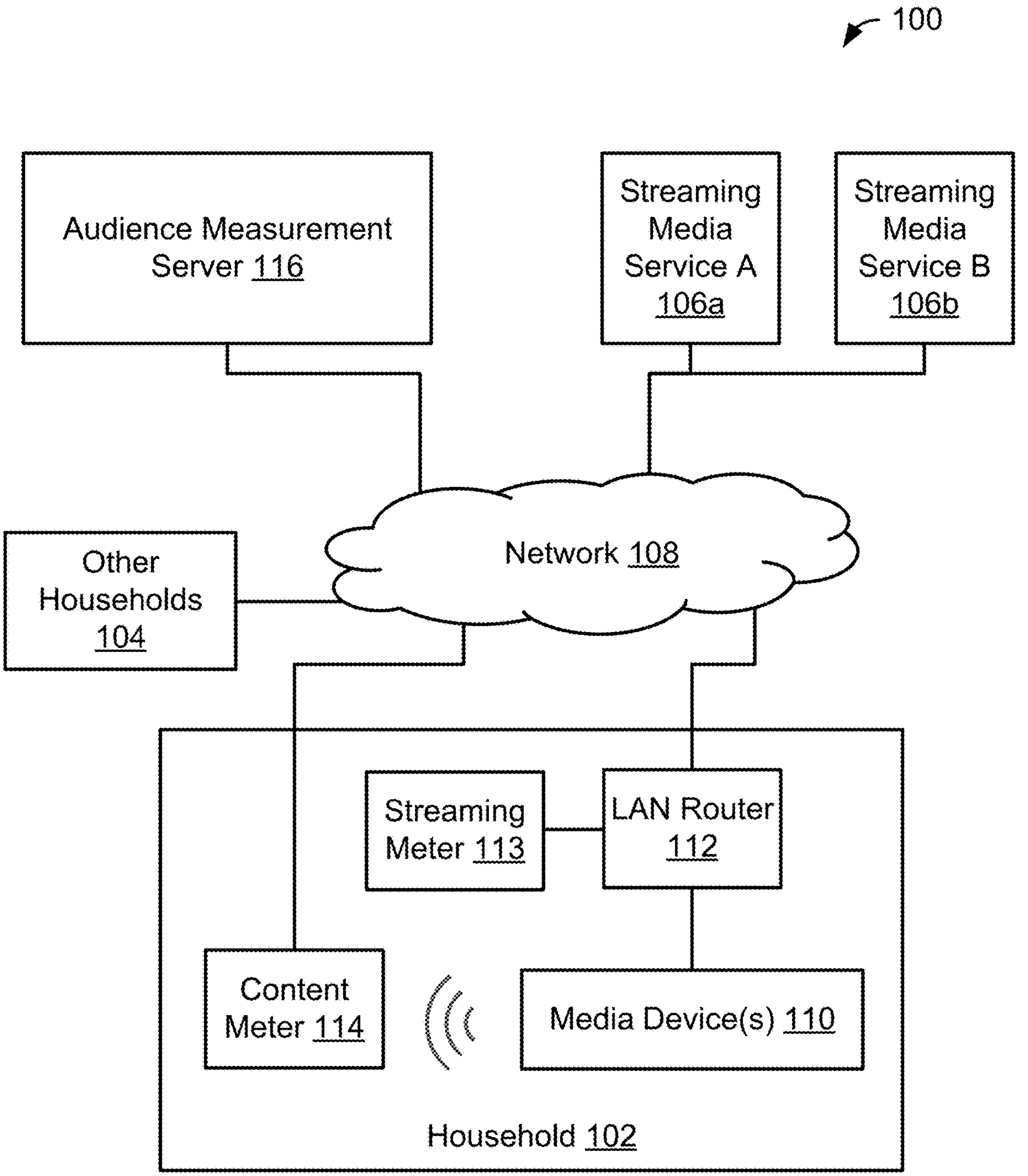
FIG. 1 is a simplified block diagram of an example audience measurement system in which impressions of a given program by multiple streaming platforms may be monitored.

Streaming media providers, advertisers, and media measurement service providers desire knowledge on how users interact with streaming services via media devices such as smartphones, tablets, laptops, smart televisions, etc. In particular, media monitoring companies rely on streaming service monitoring at the media devices to, among other things, quantify audience exposure to media, and thus determine audience behaviors related to media streaming media viewing.

Moreover, while some media programs may only be available on a single streaming media service, such as exclusively produced or licensed media programs, some media programs may be available to for streaming distribution from multiple streaming media platforms through their accompanying apps and/or web-based portals. Furthermore, the set of streaming media providers from which a given media program may be available is not fixed in time for a given household, and instead evolves over time due to changes in media licensing arrangements, the launch and/or termination of various media streaming platforms, and changes in the subscription status of the household relative to the various streaming media platforms that are available at any given time.

Estimating the extent of streaming media viewership of a given program amongst the multiple streaming media platforms on which that program is available may be performed by: identifying instances of streaming a particular media content from a set of media presentation environments; analyzing those instances of streaming the particular media content to determine one of multiple streaming platform sources associated with the particular media content based on an analysis of network traffic associated with the media presentation environments; and upon aggregating a threshold-satisfying set of such analyzed instances within a defined period of time, determining a distribution of the particular media content amongst the multiple streaming platform sources associated with the particular media content.

To facilitate such analyses, a listing of the streaming media platforms from which a given media content program can be accessed can be maintained. Such monitoring of instances of streaming may reveal an instance in which the particular media content was streamed from an additional streaming platform that is not currently associated with the particular media content. Such discrepancies may occur, for example, due to changes in the availability of the particular media content over time. When such an instance is identified, the streaming media platforms associated with the particular media content can be updated to include the additional streaming media platform.

To track household usage of streaming services, media monitoring companies can place metering devices (e.g., a streaming meter) in panel households to monitor when panelists are using the streaming services (e.g., streaming media platforms and associated apps and/or website portals thereof). Panelists are users registered on panels maintained by a ratings entity (e.g., an audience measurement company, the media monitoring company, etc.) that owns and/or operates the ratings entity subsystem. Panel households may be streaming households that are homes to which streaming media is transmitted and in which media devices present the streaming media via Wi-Fi internet, cable, satellite, etc. The meter can retrieve network traffic in the panel household, detect presentation of streaming media of the streaming services, and generate tuning data associated with the streaming media. Tuning data refers to the raw data that the meter collects via network traffic, such as the uniform resource locator (URL) of the streaming service being used, a media device on which the streaming media is presented, a start timestamp of the usage, an end timestamp of the usage, a bandwidth consumption of the usage, etc. A tuning event refers to a collection of processed tuning data that indicates a timeframe/time period during which a streaming service is used to present streaming media. For example, the meter can collect first tuning data corresponding to a first URL, a start timestamp, an end timestamp, and a bandwidth that is indicative of retrieving a video stream via a network. The meter can send the tuning data to a back office facility, such as a server, where a tuning event is generated based on the tuning data. The media monitoring company uses the tuning event and other tuning events associated with the streaming service to track household usage, subscription statuses, the share of streaming of a given program for respective streaming platforms during a given time period, and/or other analyses corresponding to the streaming service.

Streaming media includes media data (such as audio and/or video data) transmitted from a media source (e.g., a streaming service) over a data network to a media device for presentation such that a portion of the media data is presented (possibly after buffering at the media device) while a subsequent portion of the media data is being received (and possibly buffered at the media device). In some examples, the streaming media source corresponds to Netflix, Amazon Prime Video, Disney+, Hulu, Tubi, Pluto TV, Roku Channel, YouTube, Paramount+, etc. (the streaming media source may also be known as a streaming media provider), the media device corresponds to, for example, a desktop computer, a laptop computer, a mobile computing device, a television, a smart phone, a mobile phone, or another personal computing device, etc., and the data network corresponds to the Internet and/or a private network. In some examples, the media data is transmitted from the media source to the media device using one or more data transport streams established according to one or more network streaming communication protocols, such as Dynamic Adaptive Streaming over HTTP (DASH), HTTP live streaming (HLS), Real-time Transport Protocol (RTP), etc.

II. Example System Architecture

Example methods, apparatus, and articles of manufacture are disclosed herein to estimate streaming media program viewing per streaming media platform. Examples disclosed herein can determine household streaming media program viewership over a given period of time to generate analytical data (e.g., impressions) corresponding to the streaming media program for the given time period and/or for a given subset of panelists (e.g., a demographically defined subset) for the given period of time. In some examples, the media monitoring company can send the analytical data to the media provider such that the media provider can determine media programming, subscription cost, services offered, etc. that may have influenced, caused, or otherwise determined the extent of subscribers to streaming service(s) the media provider offer(s). In addition, from the set of metered households viewing a particular streaming media program in a given time period, examples described herein can further determine the streaming media platform that provided access to the particular streaming media program for those households. Such determinations may be made based on analysis of network traffic information in such households, for example. Combining together the viewership information for the particular streaming media program with the streaming media platform that provided access to such program thus allows a media monitoring company to estimate the share of streaming viewership of the particular media program attributable to respective ones of the set of streaming media platforms from which it was available during the analyzed time period. Such information may be useful to the streaming media services as well as advertisers, among others.

Referring now to FIG. 1, an example environment 100 in which usage of a streaming platform may be monitored is shown. The environment 100 includes an example household 102 connected to an example audience measurement server 116 via a network 108. The household 102 is also connected to an example streaming media service A 106*a* and an example streaming media service B 106*b* via the network 108. The household 102 includes an example media device 110, an example router 112, an example streaming meter 113, and an example meter 114.

The household 102 illustrated in FIG. 1 is a panel household as previously described. Users (panelists) in panel households can have agreements with the monitoring company (e.g., an owner/operator of the audience measurement server 116) to consent to tracking of media consumption and/or media services (e.g., streaming, cable, satellite services, etc.) via monitoring technology (e.g., hardware metering devices, software metering applications, etc.) installed in the panel household. Although one household 102 is illustrated in FIG. 1, a plurality of households 104 can be included in the environment 100. In some examples, data (e.g., tuning data, tuning events, analytical data, etc.) of the household 102 can be aggregated with data of the plurality of households 104 to analyze streaming service usage on a target population level. In other words, the aggregated data corresponding to panel households can be extrapolated to represent a larger population.

The environment 100 illustrated in FIG. 1 includes the example audience measurement server 116 to obtain tuning data from the household 102 (and households 104), generate tuning events based on the tuning data, and measure viewership of media programs through respective streaming services 106*a*, 106*b* with a computing system (e.g., the audience measurement server 116). Analytical data that the audience measurement server 116 generates based on data from the example household 102 (and additional households 104) can be provided (e.g., illustrated via a user interface) and sold to customers such as the media provider(s) 106*a* and 106*b*, among others.

Streaming media is transmitted to the example router 112 via one or more streaming services 106*a*, 106*b*. The streaming services 106*a*, 106*b* provide access to streaming media via streaming applications, websites, etc.

The environment 100 illustrated in FIG. 1 includes the media device(s) 110 to present streaming media to a user/ panelist in the household 102. As mentioned previously, the example media device(s) 110 can include a personal computer, a smart television, a mobile device, a laptop, a tablet, etc. Although one media device 110 is shown in FIG. 1, the household 102 can include a plurality of media devices 110 that can obtain media data via the network 108 and the router 112. The streaming meter 113 can detect which of the media device(s) 110 is accessing streaming media of one of the streaming services 106*a*, 106*b* at a given time. Furthermore, the meter 113 can generate different sets of tuning data corresponding to different media devices 110 when multiple media devices 110 are using streaming service(s) at a given time. The meter 113 may distinguish between streaming activity (and corresponding tuning data) from different devices based on identifiers associated with respective ones of the media device(s) 110, such as MAC addresses, network addresses assigned by the router 112, or other identifiers associated with the media device(s) 110 and/or users of those devices.

The environment 100 illustrated in FIG. 1 includes the example wireless router 112 to direct media data transmitted from the streaming service(s) 106*a*, 106*b* to the media device(s) 110 in the household 102 via wireless signals. For example, the wireless router 112 is a Wi-Fi router that uses the Wi-Fi protocol to send media data from the streaming service(s) 106*a*, 106*b* to the media device(s) 110.

The example meter 113 (e.g., a streaming meter) is included in the environment 100 of FIG. 1 to measure network traffic and to detect streaming services used to present streaming media on the media device(s) 110 during a given timeframe. In some examples, the streaming meter 113 intercepts wireless signals sent from the router 112 to the media device(s) 110 to monitor network traffic in the household 102. In some other examples, the meter 113 obtains the credentials of the router 112, connects directly to the streaming service(s) 106*a*, 106*b* via the network 108, and wirelessly routes the streaming media to the media device(s) 110. Thus, in such examples, the media device(s) 110 can connect directly to the streaming meter 113 to stream media from the streaming service(s) 106*a*, 106*b* and can connect to the router 112 seamlessly if the streaming meter 113 were to shut down, restart, malfunction, etc. In both examples, the streaming meter 113 can detect a URL of the streaming service the user accesses with the media device(s) 110, start and end timestamps corresponding to presentation of the streaming media, and a bandwidth associated with the network traffic between the media device(s) 110 and the streaming service(s) 106*a*, 106*b*. In some examples, the streaming meter 113 detects that a bandwidth associated with the network traffic does not correspond to a bandwidth indicative of streaming media. For example, the streaming meter 113 may detect a bandwidth that is more indicative of an update to a streaming application of the streaming service rather than streaming media of the streaming service.

Furthermore, the content meter 114 is able to recognize particular streaming media programs presented by the media device 110 by extracting codes (e.g., inaudible watermarks) and/or generating signatures from the audio emitted during presentation of the streaming media via the media device 110. The recognized particular streaming media item (e.g., a specific program episode identifier) can then be associated with a particular program and aggregated to analyze the extent of streaming viewership of the program per streaming media platforms on which the program is available.

Figure 2A:
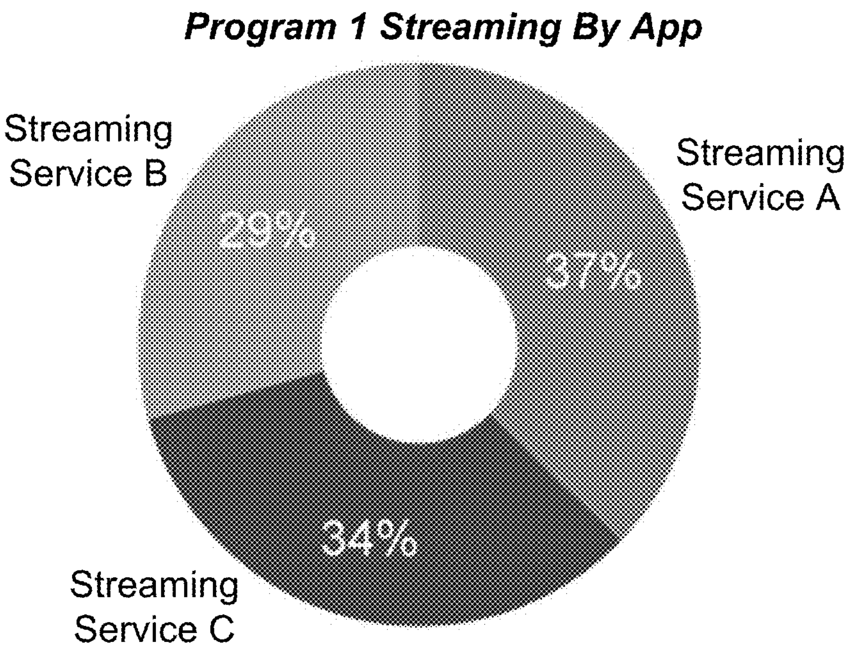
FIGS. 2A and 2B are simplified illustrations of example user interface presentations of charts indicating a distribution of estimated streaming media program viewing per streaming platform sources for two example streaming media programs.
Figure 2B:
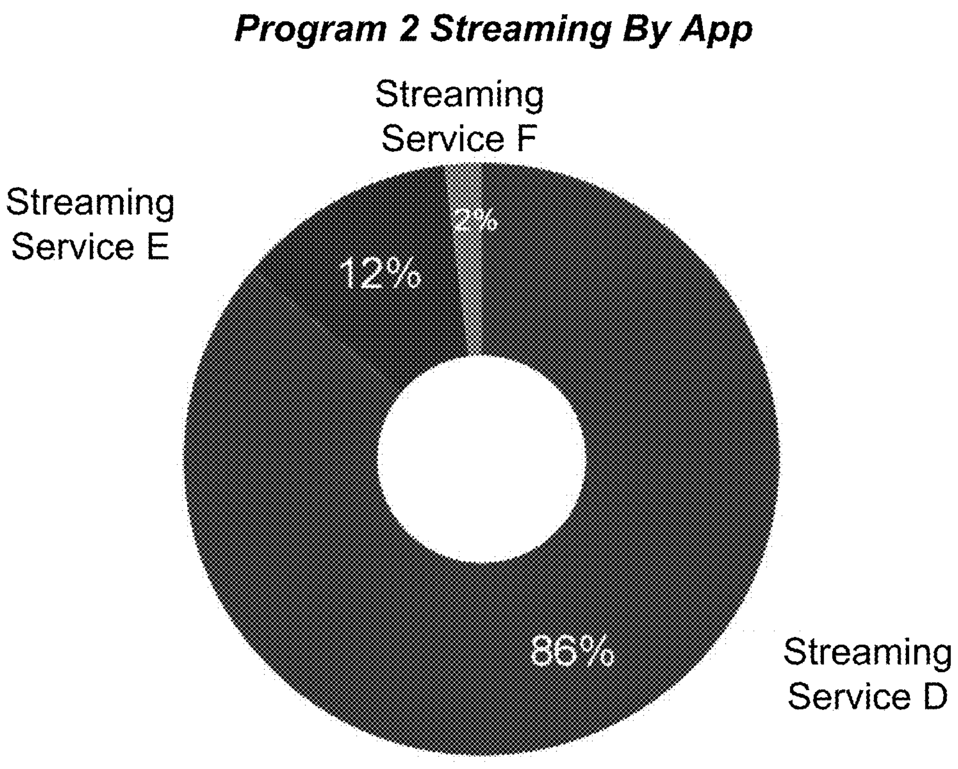

FIGS. 2A and 2B illustrate graphical representations of example user interface graphics used to convey the extent of streaming viewership of the program per streaming media platforms on which the program is available. Thus, FIG. 2A illustrates an example in which Program 1 is available on three streaming services, Streaming Service A, Streaming Service B, and Streaming Service C. As shown in the pie chart shown in FIG. 2A, during a given reporting period in which Program 1 was available from all three streaming services: 37% of streaming minutes of Program 1 were through Streaming Service A, 34% of streaming minutes of Program 1 were through Streaming Service B, and 29% of streaming minutes of Program 1 were through Streaming Service B. FIG. 2B illustrates an example in which Program 2 is available through Streaming Service D, Streaming Service E, and Streaming Service F. As shown in the pie chart shown in FIG. 2B, during a given reporting period in which Program 2 was available from all three streaming services: 86% of streaming minutes of Program 2 were through Streaming Service D, 12% of streaming minutes of Program 2 were through Streaming Service E, and 2% of streaming minutes of Program 2 were through Streaming Service F.

III. Example Operations

The audience measurement server 116 and/or components thereof can be configured to perform and/or can perform one or more operations. Examples of these operations and related features are shown in connection with the flowcharts of FIGS. 3A-3C.

Figure 3A:
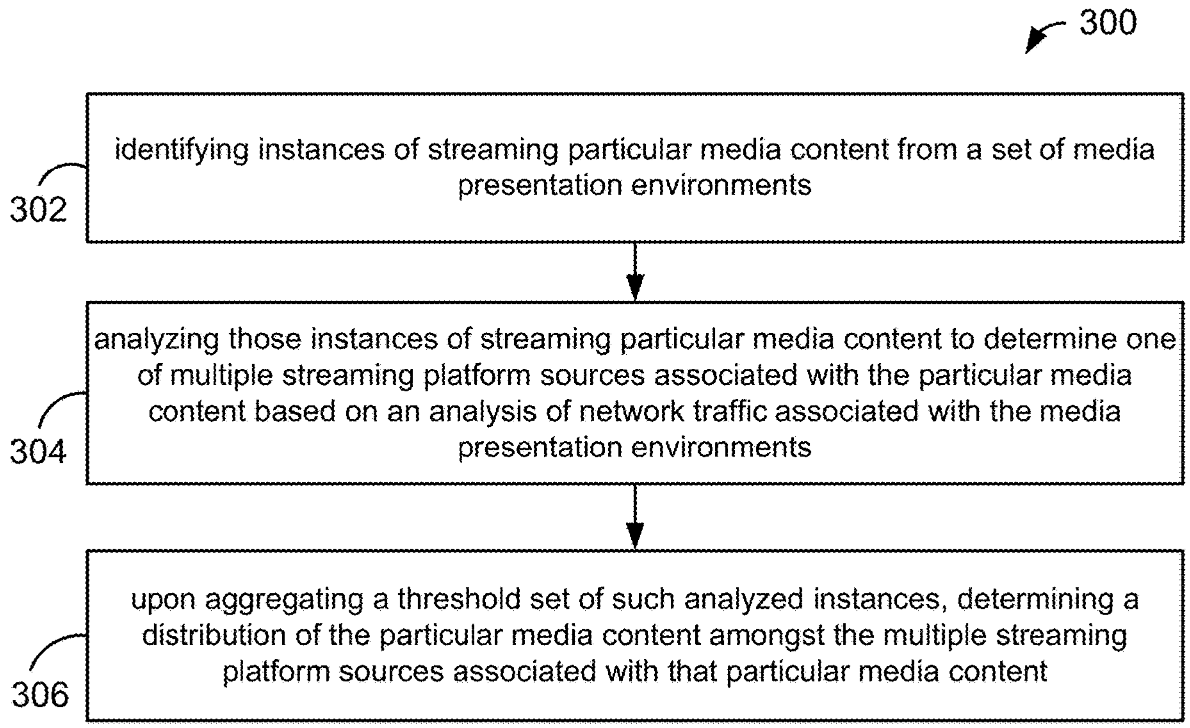
FIGS. 3A-3C are flowcharts representative of example machine readable instructions and/or example methods.

FIG. 3A is a flowchart of process 300, which may be performed by the audience measurement server 116. For instance, at block 302, the audience measurement server 116 can analyze tuning data from metered media presentation environments, such as panelist households and identify instances within the tuning data indicating of streaming a particular media content item. At block 304, those instances can be analyzed to determine which one of multiple possible streaming platform sources each particular media presentation within the media presentation environments is associated with. Determining the streaming platform source can be carried out by analyzing the network traffic associated with each of the streaming media presentations and identifying characteristic data within the network traffic that corresponds to a given one of the streaming platform sources. For instance, the network traffic associated with the tuning data may indicate that a particular URL associated with a given streaming platform is the source of the network streaming traffic, or the network traffic may indicate that the streaming media is encoded (or compressed) with a particular encoding (or compression) scheme that is distinctive of (or corresponds to) the given streaming platform. In some cases, streaming platforms may be identified with reference to a reference mapping of URLs, header information, or other distinctive network traffic features that associate network traffic data with particular streaming platform sources.

Moreover, determining the streaming platform source may be performed after determining the particular media content being presented, and then referencing a listing of the streaming media platforms from which the particular media content is available. For instance, the audience measurement server 116 can maintain a listing indicating the streaming platforms that provide access to particular media content. Then, such a listing may be referenced after determining that a given panelist household is viewing the particular media content, and used to access a set of rules to use in identifying which of the listed streaming media platforms is associated with the current streaming access to the particular media content. Among other possibilities, such a listing may indicate a set of URLs and/or URL formats associated with certain streaming media platforms, which can then be compared with the household network traffic monitored by the streaming meter 113 to select from amongst the listed streaming media platforms.

At block 306, after aggregating a threshold set of analyzed instances of streaming the particular media content, the audience measurement server can then determine a distribution of viewing of the particular media content amongst the multiple streaming media platforms on which that particular media content is known to be available. For example, the audience measurement server may report such distributions (e.g., as percentages reflecting one or more of the number of minutes of streaming, the number of unique audience members, the number of unique views) on a periodic basis, such as monthly, weekly, quarterly, etc. so long as the total number of analyzed instances satisfy a minimum threshold. Additionally or alternatively, the audience measurement server 116 may be configured to report an estimate of such streaming platform sources on an ongoing basis, with the reporting period set dynamically to ensure that a threshold number of analyzed instances of streaming the particular media content are included within the period. In some cases, the reporting period used for the particular media content may be a rolling reporting period, and the duration of the rolling reporting period may be set based on the typical number of analyzed instances of streaming the particular media content during such rolling period satisfying the minimum threshold. In some cases, setting the minimum threshold is important to avoid spurious reporting results from media content that is not widely viewed within the analyzed sample, and therefore may not provide a statistically representative sample within a given period. In some cases, reports on the distribution of streaming platforms may be based on particular episodes of media content, such as a season finale of a popular program, and in other instances, may be based on all collective viewing of episodes and/or seasons of a multi-episode and/or multi-season media program.

Figure 3B:
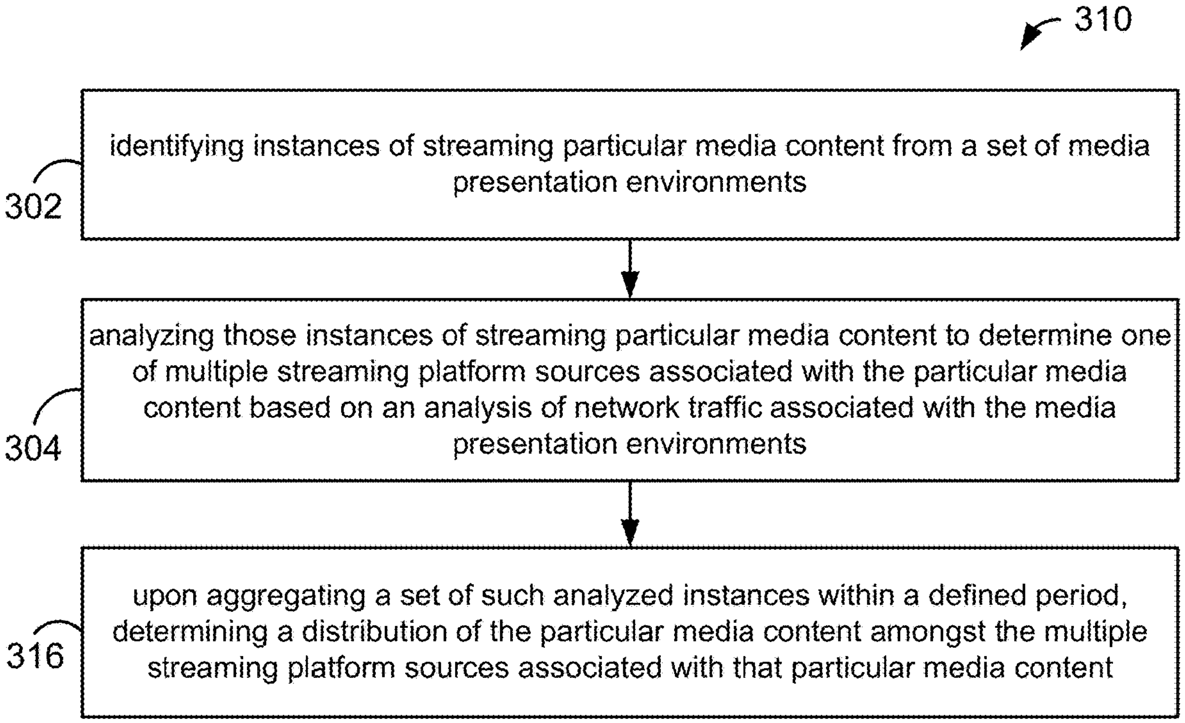

FIG. 3B is a flowchart of process 310, which may be performed by the audience measurement server 116. For instance, at block 302, the audience measurement server 116 can analyze tuning data from metered media presentation environments, such as panelist households and identify instances within the tuning data indicating of streaming a particular media content item. At block 304, those instances can be analyzed to determine which one of multiple possible streaming platform sources each particular media presentation within the media presentation environments is associated with, as described in connection with FIG. 3A.

At block 316, after aggregating a set of analyzed instances of streaming the particular media content during a given measurement period, the audience measurement server can then determine a distribution of viewing of the particular media content amongst the multiple streaming media platforms on which that particular media content is known to be available. For example, the audience measurement server may report such distributions (e.g., as percentages reflecting one or more of the number of minutes of streaming, the number of unique audience members, the number of unique views) on a periodic basis, such as monthly, weekly, quarterly, etc. Additionally or alternatively, the audience measurement server 116 may be configured to report an estimate of such streaming platform sources on an ongoing basis, with a rolling reporting period (e.g., the most recent 1 day, most recent 7 days, or most recent 30 days, etc.). In some cases, reports on the distribution of streaming platforms may be based on particular episodes of media content, such as a season finale of a popular program, and in other instances, may be based on all collective viewing of episodes and/or seasons of a multi-episode and/or multi-season media program.

Figure 3C:
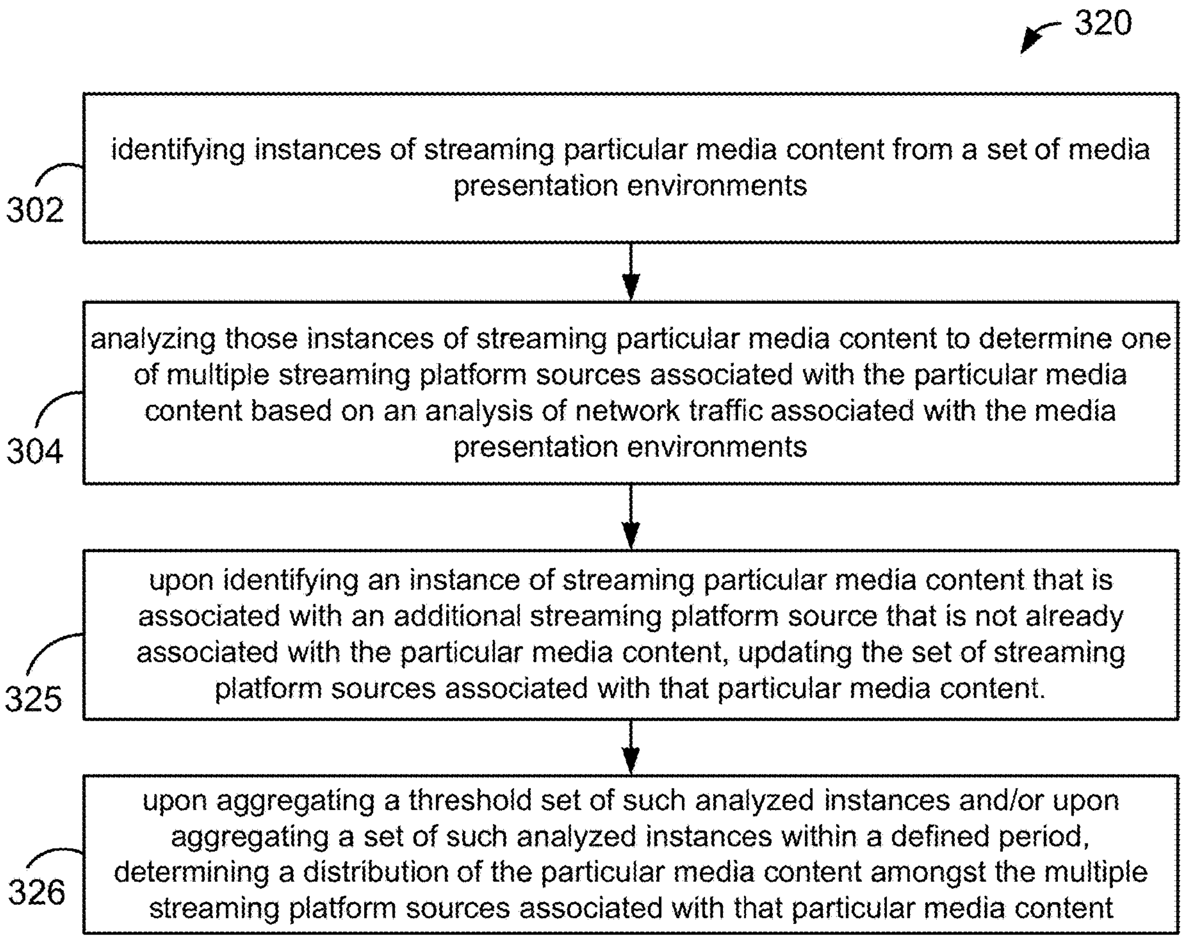

FIG. 3C is a flowchart of process 320, which may be performed by the audience measurement server 116. For instance, at block 302, the audience measurement server 116 can analyze tuning data from metered media presentation environments, such as panelist households and identify instances within the tuning data indicating of streaming a particular media content item. At block 304, those instances can be analyzed to determine which one of multiple possible streaming platform sources each particular media presentation within the media presentation environments is associated with, as described in connection with FIG. 3A.

At block 325, the audience measurement server 116 determines that at least one instance of streaming the particular media content to one of the media presentation environments is associated with a streaming platform source that is not already listed as a streaming platform source associated with the particular media content. Such a determination may be made based on information from the streaming meter 113 indicating the streaming platform source (e.g., streaming media service A **106*a*) that is the source of the particular media content presented on the media device 110. The audience measurement server 116 can then compare that streaming platform source (e.g., 106*a*) with a listing of streaming sources known to be associated with the particular media content, and if the streaming platform source is not already listed, the list reflecting the streaming platform sources on which the particular media content is available can be updated to include the additional streaming platform source. In addition, any reports of the distribution of streaming viewing of the particular media content amongst the streaming platform sources on which it is available, such as reports including pie charts similar to those illustrated in FIGS. 2A and 2B, can be updated to reflect the additional streaming platform service. In some examples, by dynamically updating the listing of streaming platform sources from which particular streaming media content is available upon receiving meter data indicating that the particular media content is available from additional streaming platform services, the audience measurement server 116** is able to provide greater adaptability and responsiveness to changing market conditions relating to the varying availability of certain streaming media content on various streaming platform services over time.

At block 326, after updating the set of streaming platform sources associated with the particular media content, the audience measurement server 116 can aggregate a set of analyzed instances that satisfy a threshold and/or are within a defined measurement period, and then determine a distribution of the particular media content amongst the multiple streaming platform sources.

IV. Example Computing Device

Any one or more of the above-described components, such as the audience measurement server 116, can take the form of a computing device, or a computing system that includes one or more computing devices.

Figure 4:
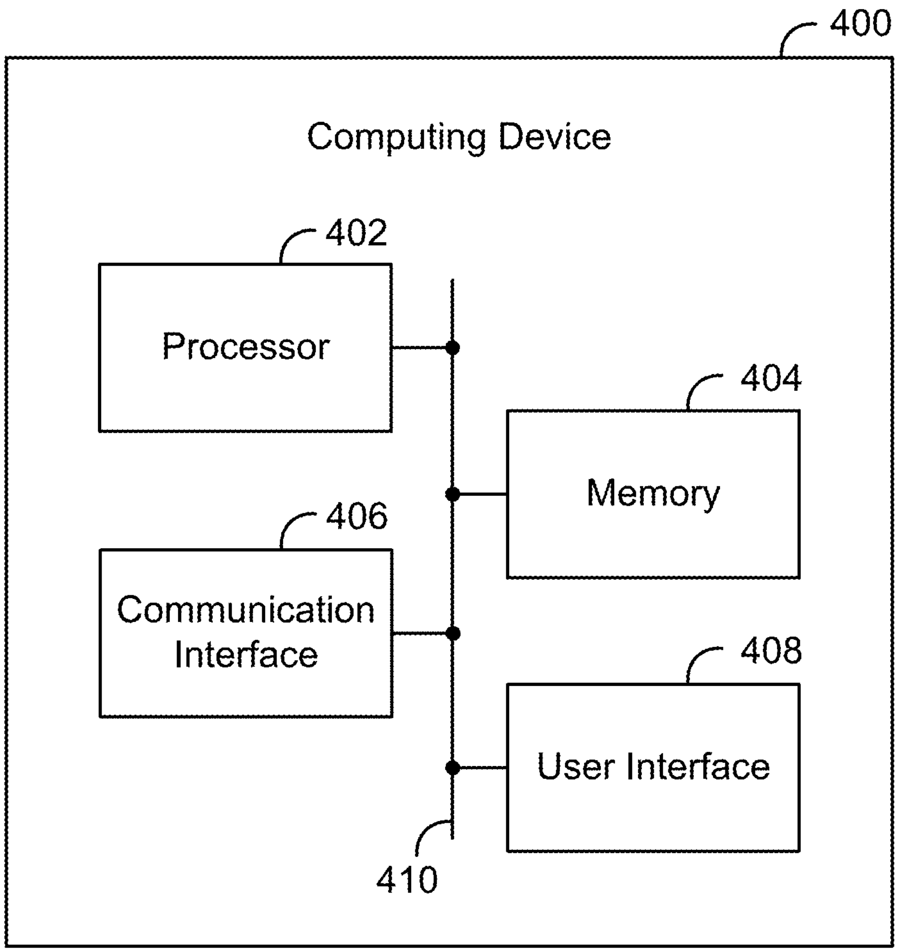
FIG. 4 is a simplified block diagram of an example computing device.

FIG. 4 is a simplified block diagram of an example computing device 400. The computing device 400 can be configured to perform one or more operations, such as the operations described in this disclosure. As shown, the computing device 400 can include various components, such as a processor 402, memory 404, a communication interface 406, and/or a user interface 408. These components can be connected to each other (or to another device, system, or other entity) via a connection mechanism 410.

The processor 402 can include one or more general-purpose processors and/or one or more special-purpose processors.

Memory 404 can include one or more volatile, non-volatile, removable, and/or non-removable storage components, such as magnetic, optical, or flash storage, and/or can be integrated in whole or in part with the processor 402. Further, memory 404 can take the form of a non-transitory computer-readable storage medium, having stored thereon computer-readable program instructions (e.g., compiled or non-compiled program logic and/or machine code) that, upon execution by the processor 402, cause the computing device 400 to perform one or more operations, such as those described in this disclosure. The program instructions can define and/or be part of a discrete software application. In some examples, the computing device 400 can execute the program instructions in response to receiving an input (e.g., via the communication interface 406 and/or the user interface 408). Memory 404 can also store other types of data, such as those types described in this disclosure. In some examples, memory 404 can be implemented using a single physical device, while in other examples, memory 404 can be implemented using two or more physical devices.

The communication interface 406 can include one or more wired interfaces (e.g., an Ethernet interface) or one or more wireless interfaces (e.g., a cellular interface, Wi-Fi interface, or Bluetooth® interface). Such interfaces allow the computing device 400 to connect with and/or communicate with another computing device over a computer network (e.g., a home Wi-Fi network, cloud network, or the Internet) and using one or more communication protocols. Any such connection can be a direct connection or an indirect connection, the latter being a connection that passes through and/or traverses one or more entities, such as a router, switcher, server, or other network device. Likewise, in this disclosure, a transmission of data from one computing device to another can be a direct transmission or an indirect transmission.

The user interface 408 can facilitate interaction between computing device 400 and a user of computing device 400, if applicable. As such, the user interface 408 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, the user interface 408 can include hardware and/or software components that facilitate interaction between the computing device 400 and the user of the computing device 400.

The connection mechanism 410 can be a cable, system bus, computer network connection, or other form of a wired or wireless connection between components of the computing device X00.

One or more of the components of the computing device 400 can be implemented using hardware (e.g., a digital signal processor (DSP), an application-specific integrated circuit (ASIC), a field-programmable gate array (FPGA), another programmable logic device, or discrete gate or transistor logic), software executed by one or more processors, firmware, or any combination thereof. Moreover, any two or more of the components of the computing device 400 can be combined into a single component, and the function described herein for a single component can be subdivided among multiple components.

V. Example Variations

Although the examples and features described above have been described in connection with specific entities and specific operations, in some scenarios, there can be many instances of these entities and many instances of these operations being performed, perhaps contemporaneously or simultaneously, on a large-scale basis.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. An audience measurement computing system comprising:

at least one processor; and a non-transitory computer-readable storage medium having stored thereon program instructions that, upon execution by the at least one processor, cause performance of a set of operations comprising:

identifying instances of streaming a particular media content from a set of media presentation environments;

analyzing those instances of streaming the particular media content to determine one of multiple streaming platform sources associated with the particular media content based on an analysis of network traffic associated with the media presentation environments; and upon aggregating a threshold-satisfying set of such analyzed instances, determining a distribution of the particular media content viewing amongst the multiple streaming platform sources associated with the particular media content.

2. The audience measurement computing system of claim 1, wherein the set of operations further include:

identifying an instance of streaming the particular media content that is associated with an additional streaming platform source that is not one of the multiple streaming platform sources associated with the particular media content; and based on identifying the instance of streaming the particular media content that is associated with the additional streaming platform source, updating the multiple streaming platform sources associated with the particular media content to include the additional streaming platform source.

3. The audience measurement computing system of claim 1, wherein the set of operations further includes maintaining a listing of the multiple streaming platform sources associated with the particular media content.

4. The audience measurement computing system of claim 1, wherein the threshold-satisfying set of such analyzed instances are within a defined measurement period.

5. The audience measurement computing system of claim 1, wherein the set of operations further includes identifying the instances of streaming the particular media content based on audio signature data from content meters associated with the set of media presentation environments.

6. The audience measurement computing system of claim 1, wherein the set of operations further includes determining the one of multiple streaming platform sources associated with the particular media content based on a streaming platform distinctive uniform resource locator address indicated by the network traffic associated with a given one of the media presentation environments.

7. The audience measurement computing system of claim 1, wherein the set of operations further includes presenting the determined distribution of the particular media content viewing amongst the multiple streaming platform sources.

8. The audience measurement computing system of claim 1, wherein determining the distribution of the particular media content viewing is based on minutes of viewing the particular media content within the media presentation environments.

9. A method comprising:

identifying instances of streaming a particular media content from a set of media presentation environments;

analyzing those instances of streaming the particular media content to determine one of multiple streaming platform sources associated with the particular media content based on an analysis of network traffic associated with the media presentation environments; and upon aggregating a threshold-satisfying set of such analyzed instances, determining a distribution of the particular media content viewing amongst the multiple streaming platform sources associated with the particular media content.

10. The method of claim 9, further including:

identifying an instance of streaming the particular media content that is associated with an additional streaming platform source that is not one of the multiple streaming platform sources associated with the particular media content; and based on identifying the instance of streaming the particular media content that is associated with the additional streaming platform source, updating the multiple streaming platform sources associated with the particular media content to include the additional streaming platform source.

11. The method of claim 9, further including maintaining a listing of the multiple streaming platform sources associated with the particular media content.

12. The method of claim 9, wherein the threshold-satisfying set of such analyzed instances are within a defined measurement period.

13. The method of claim 9, further including identifying the instances of streaming the particular media content based on audio signature data from content meters associated with the set of media presentation environments.

14. The method of claim 9, further including determining the one of multiple streaming platform sources associated with the particular media content based on a streaming platform distinctive uniform resource locator address indicated by the network traffic associated with a given one of the media presentation environments.

15. The method of claim 9, further including presenting the determined distribution of the particular media content viewing amongst the multiple streaming platform sources.

16. A non-transitory computer readable storage medium having stored thereon instructions that, when executed by a processor, cause performance of:

identifying instances of streaming a particular media content from a set of media presentation environments;

analyzing those instances of streaming the particular media content to determine one of multiple streaming platform sources associated with the particular media content based on an analysis of network traffic associated with the media presentation environments; and upon aggregating a threshold-satisfying set of such analyzed instances, determining a distribution of the particular media content viewing amongst the multiple streaming platform sources associated with the particular media content.

17. The non-transitory computer readable storage medium of claim 16, wherein the instructions further cause, when executed by the processor, performance of:

identifying an instance of streaming the particular media content that is associated with an additional streaming platform source that is not one of the multiple streaming platform sources associated with the particular media content; and based on identifying the instance of streaming the particular media content that is associated with the additional streaming platform source, updating the multiple streaming platform sources associated with the particular media content to include the additional streaming platform source.

18. The non-transitory computer readable storage medium of claim 16, wherein the instructions further cause, when executed by the processor, performance of maintaining a listing of the multiple streaming platform sources associated with the particular media content.

19. The non-transitory computer readable storage medium of claim 16, wherein the instructions further cause, when executed by the processor, performance of identifying the instances of streaming the particular media content based on audio signature data from content meters associated with the set of media presentation environments.

20. The non-transitory computer readable storage medium of claim 16, wherein the instructions further cause, when executed by the processor, performance of determining the one of multiple streaming platform sources associated with the particular media content based on a streaming platform distinctive uniform resource locator address indicated by the network traffic associated with a given one of the media presentation environments.

* * * * *